US006792544B2

(12) United States Patent
Hashem et al.

(10) Patent No.: US 6,792,544 B2
(45) Date of Patent: Sep. 14, 2004

(54) METHOD AND SYSTEM FOR SECURE TRANSMISSION OF INFORMATION

(75) Inventors: Tony Hashem, Lynchburg, VA (US); Riad Hasan, Forest, VA (US)

(73) Assignee: GE Financial Assurance Holdings, Inc., Richmond, VA (US)

( * ) Notice: Subject to any disclaimer, the term of this patent is extended or adjusted under 35 U.S.C. 154(b) by 532 days.

(21) Appl. No.: 09/824,052

(22) Filed: Apr. 3, 2001

(65) Prior Publication Data

US 2002/0144148 A1 Oct. 3, 2002

(51) Int. Cl.[7] ............................. G06F 7/00; H04L 9/00
(52) U.S. Cl. ...................... 713/201; 713/170; 713/201; 709/206; 709/229; 380/25; 380/30
(58) Field of Search .................. 713/170, 201; 380/25, 30; 709/206, 229

(56) References Cited

U.S. PATENT DOCUMENTS

| | | | |
|---|---|---|---|
| 5,473,691 A | * | 12/1995 | Menezes et al. .............. 380/25 |
| 5,553,083 A | | 9/1996 | Miller |
| 5,701,484 A | | 12/1997 | Artsy |
| 5,751,970 A | | 5/1998 | Bournas |
| 5,805,810 A | | 9/1998 | Maxwell |
| 5,903,723 A | | 5/1999 | Beck et al. |
| 6,085,251 A | | 7/2000 | Fabozzi, II |
| 6,092,101 A | * | 7/2000 | Birrell et al. ................ 709/206 |
| 6,098,180 A | * | 8/2000 | Kobata et al. ................. 714/18 |
| 6,161,181 A | * | 12/2000 | Haynes, III et al. ......... 713/170 |
| 6,192,407 B1 | * | 2/2001 | Smith et al. ................. 709/229 |
| 6,192,412 B1 | | 2/2001 | Cantoral et al. |
| 6,282,565 B1 | | 8/2001 | Shaw et al. |
| 6,327,611 B1 | | 12/2001 | Everingham |
| 6,370,567 B1 | | 4/2002 | Ouchi |
| 6,385,595 B1 | | 5/2002 | Kolling et al. |
| 6,615,383 B1 | * | 9/2003 | Talluri et al. ................ 714/749 |
| 2001/0037464 A1 | * | 11/2001 | Persels et al. ............... 713/201 |
| 2002/0046250 A1 | * | 4/2002 | Nassiri ......................... 709/206 |
| 2002/0184224 A1 | * | 12/2002 | Haff et al. ..................... 707/10 |

OTHER PUBLICATIONS

Secure online Delivery of Document, Internet World, Dec. 7, 1998, by Sarah L Roberts–Wtt, downloaded from the Interne Apr. 27, 2004.*
E–Parcel Announces 256 bit Security Worldwide, May 8, 2000, Business Wire, Business Editors, Downloaded from the Interne Apr. 27, 2004.*
PCT–International Search Report dated 7–11 200, for application No. PCT/US02/09569, filed Mar. 29, 2002.
U.S. patent application 09/760,296 filed Jan. 16, 2001 and the references cited therein.
U.S. patent application 10/116,056 filed Apr. 5, 2002 and the references cited therein.
U.S. patent application 10/309,084 filed Dec. 4, 2002 and the references cited therein.

* cited by examiner

Primary Examiner—Ayaz Sheikh
Assistant Examiner—Taghi T Arani
(74) Attorney, Agent, or Firm—Hunton & Williams LLP

(57) ABSTRACT

The invention includes a system and method for secure transmission of information. The system includes a source system for generating, encrypting, and transmitting a data file and a host system for receiving and decrypting the transmitted data file. Both the host system and the source system include delivery confirmation tools for confirming that the sent files correspond to the received files. A corresponding method comprises generating a data file at the source system, encrypting the generated data file, and sending the encrypted data file. A host system receives and decrypts the encrypted data file. The source system generates a list of sent files and the host system generates a list of received files. Comparison tools verify delivery by comparing the list of sent files with the list of received files.

34 Claims, 6 Drawing Sheets

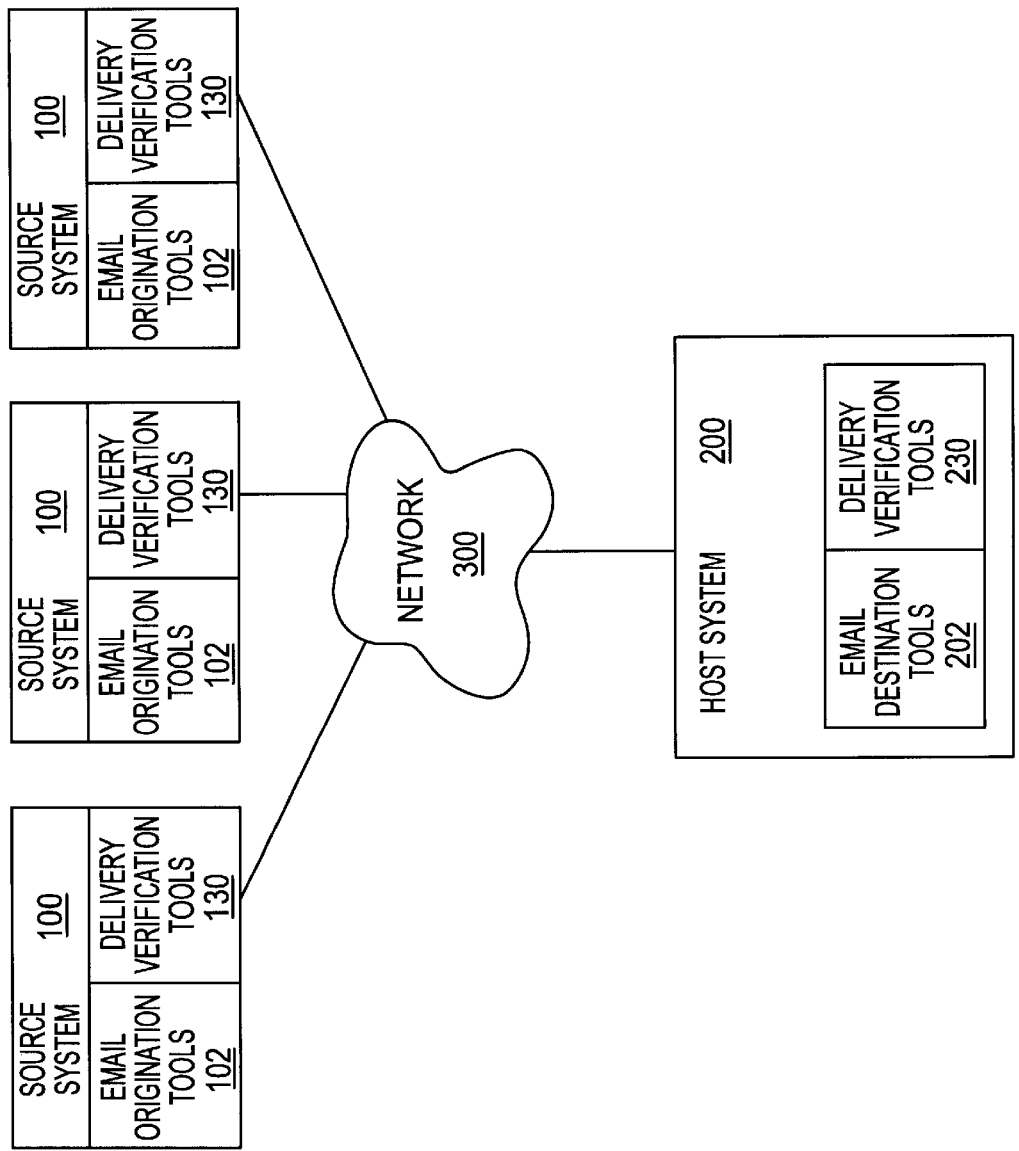

METHOD AND SYSTEM FOR SECURE TRANSMISSION OF INFORMATION

FIELD OF THE INVENTION

The present application relates to the transmission of information via electronic mail and more particularly to the secure transmission of electronic mail that allows for confirmation of receipt of all sent documents by both the sender and the receiver.

BACKGROUND OF THE INVENTION

In recent years, it has become common practice to transfer information electronically. Techniques which have been proposed include the use of the Internet through email or the use of the internet through an FTP server. Unfortunately, these two methods are non-secure, do not guarantee delivery, and require a manual process by both the sender and receiver. Users of electronic mail have had increasing concerns with the security of sending electronic mail. It is generally impossible for a receiver to ascertain whether all sent documents have been received. Mail that has been misdirected or intercepted is generally undetectable to the intended recipient of the electronic mail and often is also undetected by the sender. While some systems allow a receiver and/or sender to ensure a level of security, no currently available systems automatically provide all of the services described above.

To remedy security concerns, it has become common practice to send electronic mail through an intermediary service that uses a dedicated line or have the sender and receiver establish their own connectivity such as a Virtual Private Network (VPN), leased lines, dedicated circuits, or any other workable connection. These techniques can be expensive and may require subject matter expertise. Intermediaries typically charge by the page or by size for each transmitted document as the connectivity itself is quite expensive and the cost is passed along.

In view of the deficiencies described above in the known interfaces, an alternative is needed for efficiently and economically transferring documents through the Internet using an electronic mail system.

SUMMARY OF THE INVENTION

In accordance with the purposes of the invention as embodied and broadly described herein, there is provided a secure information transmission system for securely transmitting electronic files from a source system to a host system. The secure information transmission system comprises origination tools on the source system including encryption tools for encrypting a data file for attachment to an outgoing email; destination tools on the host system including decryption tools for decrypting the data file; and delivery confirmation tools on both the source system and the host system. The delivery confirmation tools comprise list generating tools connected with the first system for generating a list of sent data files successfully transmitted during a given time period, means for maintaining a list of received files during the given period on the host system, and comparison means connected with the host system for comparing the list of sent files with the list of received files.

In an additional aspect, a secure information transmission system for securely transmitting electronic files from a source system to a host system is provided. The secure information transmission system comprises origination tools on the source system for creating and sending files. The origination tools comprise file generation tools for generating a data file, an encryption engine for encrypting the data file, failure indication tools for detecting rejected files from the encryption engine, attachment tools for attaching encrypted files to an email message, and emailing tools for forwarding the email message to the host system. The system additionally comprises destination tools on the host system for receiving the email message. The destination tools comprise an inbox for receiving the email message, message extraction tools for extracting file attachments, decryption tools for receiving the extracted file attachments, error detection tools for detecting unsuccessful decryption attempts, and an outbox for receiving decrypted files and providing them for processing.

In yet an additional aspect, a secure information transmission system for securely transmitting electronic files from a source system to a host system is provided. The secure information transmission system comprises origination tools on the source system for creating and sending files. The origination tools comprise file generation tools for generating a data file and an associated index file, an inbox for storing the generated data file and the index file, examination tools for examining files stored in the inbox to verify that all stored files include an index file paired with a data file, an encryption engine for encrypting the pairs of data and index files, failure indication tools for detecting rejected files from the encryption engine and the examination tools, attachment tools for attaching encrypted files to an email message, and emailing tools for forwarding the email message and attached files to the host system. The system further comprises destination tools on the host system for receiving the email message. The destination tools comprise an inbox for receiving the email message, message extraction tools for extracting file attachments, decryption tools for decrypting the extracted file attachments, error detection tools for detecting unsuccessful decryption attempts, and an outbox for receiving decrypted files and providing the decrypted files for processing. The system further comprises delivery verification tools, the delivery verification tools comprising source list generating tools for generating a list of successfully sent files from the source system, host list tools for generating a list of received files at the host system, and comparison tools for comparing the list of sent files with the list of received files at the host system.

In yet another aspect, the invention comprises a method for securely transmitting electronic files from a source system to a host system. The method comprises: (a) encrypting a data file for attachment to an outgoing email using encryption tools; (b) decrypting the email with destination tools on the host system including decryption tools for decrypting the data file; and (c) confirming delivery using confirmation tools on both the source system and the host system. Confirming delivery comprises, generating a list of sent files sent during a given time period using list generating tools connected with the first system, maintaining a list of received files during the given time period on the host system, and comparing the list of sent files with the list of received files using comparison means connected with the host system.

In yet an additional aspect, the invention comprises a method for securely transmitting electronic files from a source system to a host system. The method comprises (a) performing a remote process including generating a data file, generating an index file for pairing with the data file, and sending the data file and the index file to an inbox. The remote process further comprises examining the index file in the inbox to determine if the index file is valid, encrypting at least the data file paired with a valid index file, testing for successful encryption, attaching successfully encrypted files to an email message, and sending the email message to the host system. The method additionally comprises performing a host procedure. The host procedure comprises the steps of receiving and storing the message from the source system, extracting the data file and index file from the message, decrypting the data file upon successful extraction, and moving the decrypted message to an outbox for processing by another system.

In yet a further aspect, the invention comprises a method for securely transmitting electronic files via email from a source system to a host system. The method comprises performing a remote process. The remote process comprises the steps of generating a data file, generating an index file for pairing with the data file, and sending the data file and the index file to an inbox. The method further comprises examining the index file in the inbox to determine if the index file is valid, encrypting at least the data file paired with a valid index file, testing for successful encryption, attaching successfully encrypted files to an email message, and sending the email message to the host system. The method further comprises performing a host procedure. The host procedure comprises the steps of, receiving and storing the message from the source system, extracting the data file and index file from the message, decrypting the data file upon successful extraction, and moving the decrypted message to an outbox for processing by another system. The method additionally comprises performing a delivery verification procedure. The delivery verification procedure comprising the steps of, generating a list of successfully sent files from the source system, generating a list of received files at the host system, and comparing the list of sent files with the list of received files at the host system.

These and other features, objects, and advantages of the preferred embodiments will become apparent when the detailed description of the preferred embodiments is read in conjunction with the drawings attached hereto.

BRIEF DESCRIPTION OF THE DRAWINGS

The present invention can be understood more completely by reading the following Detailed Description of exemplary embodiments, in conjunction with the accompanying drawings, in which:

FIG. 1 is a block diagram showing an implementation of the secure information transmission system of the invention;

DETAILED DESCRIPTION OF THE PREFERRED EMBODIMENT

Figure 3:
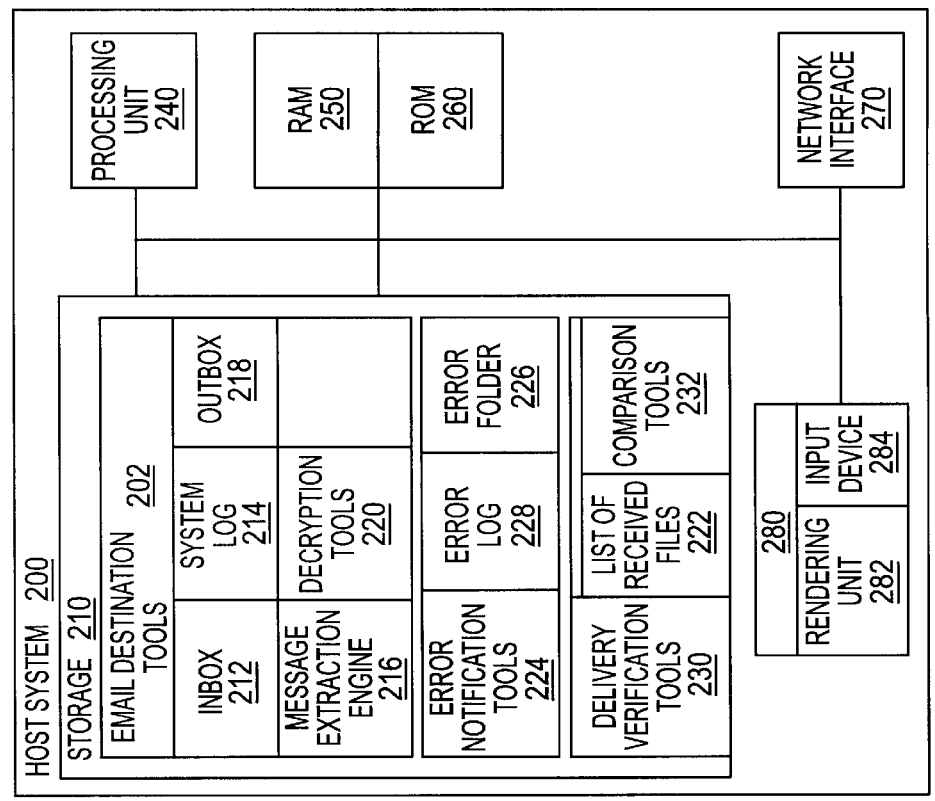
FIG. 3 is a block diagram showing an embodiment of the host system of the invention.

Reference will now be made in detail to the present preferred embodiments of the invention, examples of which are illustrated in the accompanying drawings in which like reference numerals refer to corresponding elements.

FIG. 1 is a block diagram illustrating an implementation of a secure information transmission system for ensuring secure transfer of information. The information may comprise a document or an electronic image such as the type contained in a JPG, MP3, Tiff, EXE or any other type of file. This file is the data file which is to be transferred from a source system 100 to a host system 200 over a network 300.

The source system 100 preferably comprises a computer. The computer may comprise any known type of computer and may operate using any one of a variety of operating programs such as the Microsoft Windows™ 98 programs. Origination tools 102 and delivery verification tools 130 are resident on the source system 100.

The source system 100 is communicatively coupled to other computers (e.g. the host system 200) using the network interface 160 via the network 300. The network 300 can be formed as an intranet, a PAN (Personal Area Network), a LAN (Local Area Network), a WAN (Wide Area Network), a MAN (Metropolitan Area Network) or other type of network. The network 300 may alternatively use wireless technology to connect computers together. The source system 100 may also communicate with the Internet via an Internet service provider.

The network 300 may operate using any network-enabled code, such as Hyper Text Markup Language (HTML), Dynamic HTML, Extensible Markup Language (XML), Extensible style sheet and Specification Language (DSSSL), Java™, etc.

The host system 200 also comprises a computer. The computer may comprise any known type of computer and may operate using any one of a variety of operating programs such as the Microsoft Windows™ 98 programs. Destination tools 202 and delivery verification tools 230 are resident on the host system 200.

Figure 2:
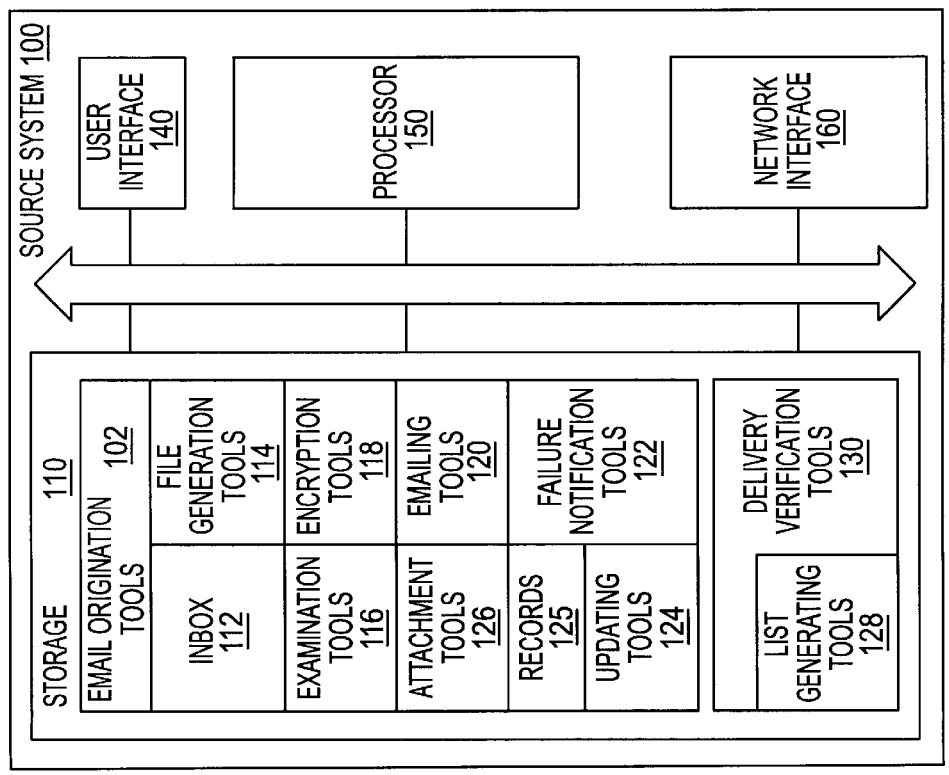
FIG. 2 is a block diagram showing an embodiment of the source system of the invention.

With further reference to FIG. 2, the computer includes a user interface 140, a processor 150, a network interface 160 and a storage area 110. The processor 150 is connected to the storage area 100 via a bus 105. The storage may comprise a RAM, a ROM, and other types of storage devices such as a CDROM or other optical storage. The storage area 110 includes the origination tools 102. The origination tools 102 preferably include file generation tools 114 which include a means for generating files to be transferred and an inbox 112 for storing the generated files. The origination tools 102 additionally include examination tools 116. The examination tools 116 include a means for examining file stored in the inbox to verify that all stored files are correctly formatted.

In a preferred embodiment, the file generation tools 114 generate both a data file and an index file to be paired with each data file. A technique for performing this operation is fully disclosed in co-pending U.S. patent application Ser. No. 09/760,296 filed on Jan. 16, 2001 and entitled System and Process for Routing Information in a Data Process System, which is hereby incorporated by reference. Although the technique disclosed in the aforementioned application is a preferred technique, other known techniques for pairing an index file with a data file may also be used.

Additionally, it is possible to construct the secure information transmission system without the use of an index file. If no index file is used, the examination tools 116 need not be included with the origination tools 102.

An encryption engine 118 includes a means for encrypting the generated files prior to transfer of the files. Failure notification tools 122 detect rejected files from the encryption engine 118 and the examination tools 116. The encryption engine 118 may operate substantially as disclosed in co-pending U.S. patent application Ser. No. 09/773,535, filed on Feb. 2, 2001, and entitled System and Method for Automatically Securing Data for Transmission, hereby incorporated by reference. Other known encryption techniques may also be employed.

Attachment tools 126 include a means for attaching files that are successfully encrypted and examined to a generated email message. Emailing tools 120 forward the email message and attached files to the host system 200. Upon the sending of an email message, updating tools 124 update source system records 125. The attachment of data files to email messages is merely an exemplary embodiment of the invention. The data files could be transmitted by some mechanism other than email, such as through a dedicated circuit established for communication between the source and host system.

The source system 100 additionally includes delivery verification tools 130 that work in conjunction with delivery verification tools 230 on the host system 200 in order to confirm delivery and receipt of email messages. The delivery verification tools include the list generating tools 128. The list generating tools 128 include means for generating a list of successfully sent files.

FIG. 3 illustrates an embodiment of the host system 200. The host system 200 preferably includes a storage area 210, a processing unit 240, a user interface 280, a network interface 270, an additional storage comprising a Random Access Memory (RAM) 250 and a Read Only Memory (ROM) 260. The storage area 210 preferably comprises destination tools for receiving the email message sent by the source system 100. The destination tools 202 include an inbox 212 for receiving the sent message. The inbox 212 must resides on an SMTP compliant server. After message receipt, a message extraction engine 216 extracts file attachments from the received messages. Decryption tools 220 include means for decrypting the extracted file attachments. Error notification tools 224 examine the decrypted files for unsuccessful decryption attempts. Upon successful decryption, files proceed to an outbox 218 for receiving decrypted files and providing them for processing.

The host system additionally comprises delivery verification tools 230 that work in conjunction with the delivery verification tools 130 on the source system 100. The delivery verification tools preferably include a list of received files 222 and comparison tools 232. The comparison tools 232 include means for comparing the list of received files 222 with the list of successfully sent files generated by the list generating tools 128.

The delivery verification tools 130 and 230 may respectively keep lists of data files, index files, and messages that have been sent or received. The delivery verification tools 130 and 230 may keep lists which include all of the above-mentioned pieces of information or any combination of these pieces of information.

An error log 228 and an error folder 226 additionally work in conjunction with error notification tools 224 to perform an error routine upon unsuccessful transfer of files. Specifically, the error notification tools 224 move a failed message to the error folder 226 and update the error log 228. As a result of this process, the host system 200 sends an email to a support system that can further handle the failed delivery.

Figure 4:
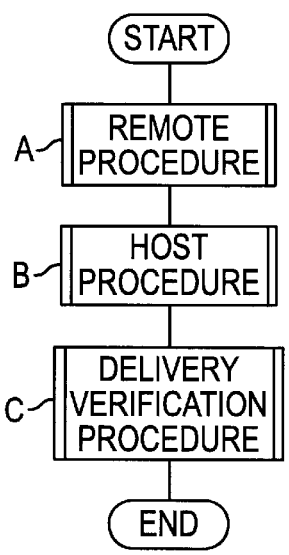
FIG. 4 is a flow chart showing the main procedures of the method of the invention.

FIG. 4 is a flow chart showing the main procedures of the email management method. Procedure A is a remote procedure performed by the source system 100. Procedure B is a host procedure performed by the host system 200. Finally, Procedure C is a delivery verification procedure that is performed jointly by both the source system 100 and the host system 200. The details of each of these main procedures are disclosed fully in FIGS. 5–11.

Figure 5:
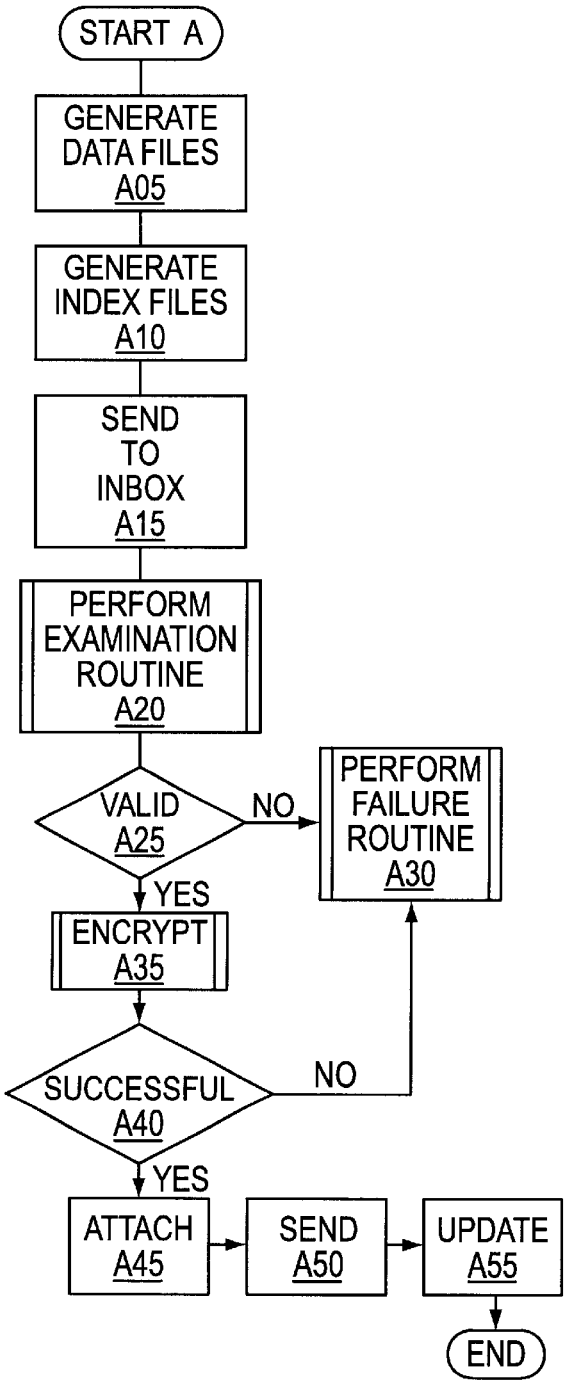
FIG. 5 is a flow chart showing the steps of a main procedure of the invention.
Figure 10:
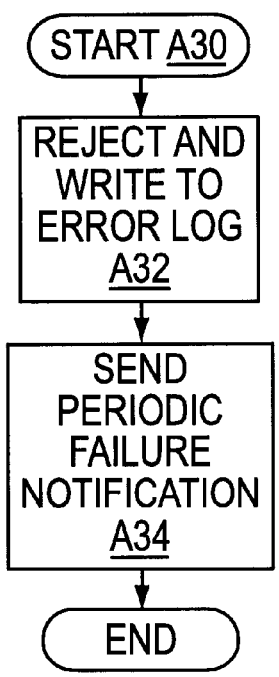
FIG. 10 is a flow chart showing further steps of the main procedure of FIG. 5.

FIG. 5 is a flow chart illustrating the steps involved in the remote Procedure A. In Step A05, file generation tools 114 generate data files for transferring. In Step A10, the file generation tools 114 generate an index file to be paired with each data file. In Step A15, the inbox 112 receives the generated files. In Step A20, the examination tools 116 perform an examination routine. The specifics of the examination routine may vary depending upon the particular index system selected. Alternatively, the system may function without an index file and may avoid the necessity for an examination routine. If an examination routine A20 is performed, the system 100 determines in Step A25 whether the generated files are valid. If the files are not valid, failure notification tools 122 perform a failure routine A30. The details of the failure routine are illustrated in FIG. 10. Specifically, as shown in FIG. 10, the failure notification tools 122 reject the files and right to an error log in Step A32. In Step A34, the failure notification tools send a periodic failure notification.

If in Step A25, the examined files are valid, the encryption tools 118 perform an encryption routine in Step A35. The encryption tools 118 may employ any suitable encryption method. In Step A40, the failure notification tools determine the success of the encryption. If the encryption was not successful, the above-described failure routine A30 again executes. Alternatively, if the encryption is successful, the attachment tools 126 attach the encrypted files to an email in Step A45. Emailing tools 120 send the email an attached file in Step A50. In Step A55, the updating tools A55 update existing records.

Figure 6:
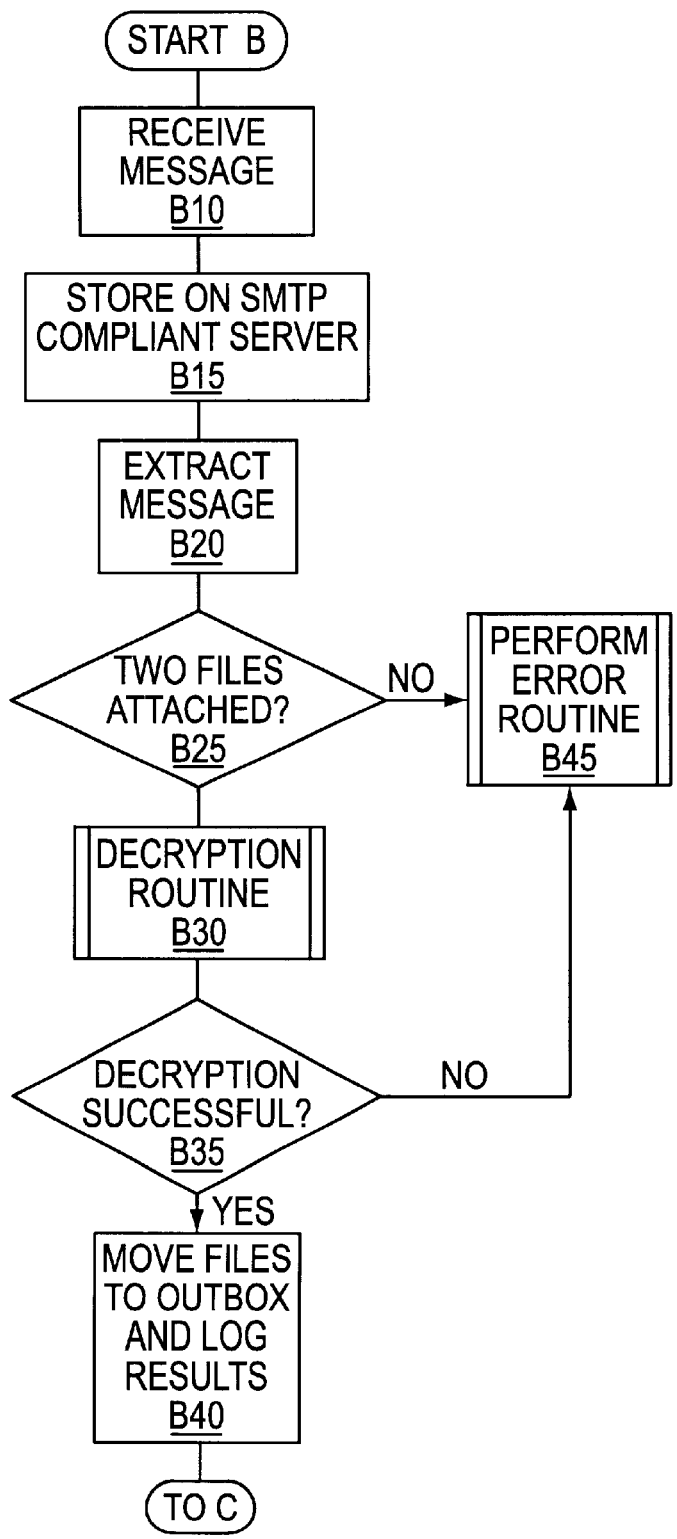
FIG. 6 is a flow chart showing the steps of another main procedure of the invention.
Figure 11:
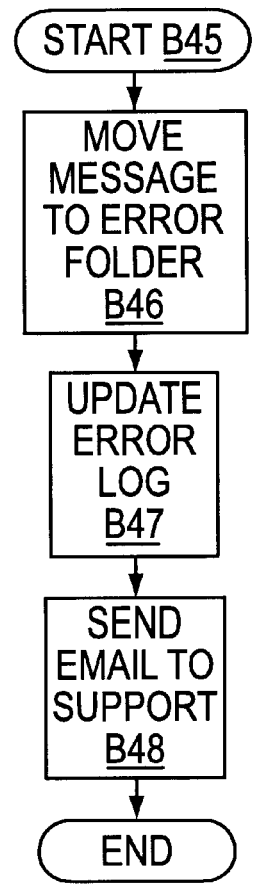
FIG. 11 is a flow chart showing further steps of the main procedure of FIG. 6.

FIG. 6 illustrates the steps of the host Procedure B. In Step B10, the host system 200 receives the message transmitted by the source system 100. In Step B15, the host system stores the received message in inbox 212. In Step B20, the message extraction engine 216 extracts the stored message from the inbox 212. In Step B25, the extraction engine 216 determines whether the requisite files are attached. If the requisite files are not attached, error notification tools 224 perform an error routine in Step B45. The specifics of the error routine are illustrated in FIG. 11. In Step B46, the error notification tools 224 move the message to the error folder 226. In Step B47, the error notification tools 224 update the error log 228. Finally, in Step B48, the error notification tools 224 forward an email message to technical support.

Alternatively, if in Step B35 the decryption routine has been successful, the host system 200 moves the decrypted files to the outbox 218 in Step B40 for further processing.

Figure 7:
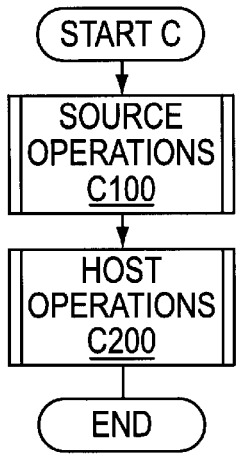
FIG. 7 is a flow chart showing the steps of another main procedure of the invention.

FIG. 7 illustrates the two principal steps involved in the delivery verification Process C. In Step C100, the source system 100 performs source operations to confirm delivery. In Step C200, the host system 200 performs host operation to confirm message delivery. The details of these two principal steps are illustrated in FIGS. 8 and 9.

Figure 8:
FIG. 8 is a flow chart showing further steps of the procedure of FIG. 7.

FIG. 8 illustrates the source operations C100 involved in confirming message delivery. In Substep C110, the list generating tools 128 generate a sent file list. In Step C120, the attachment tools 126 to an outgoing email message. In Step C130, the emailing tools 120 transmit the email message to the host system 200.

Figure 9:
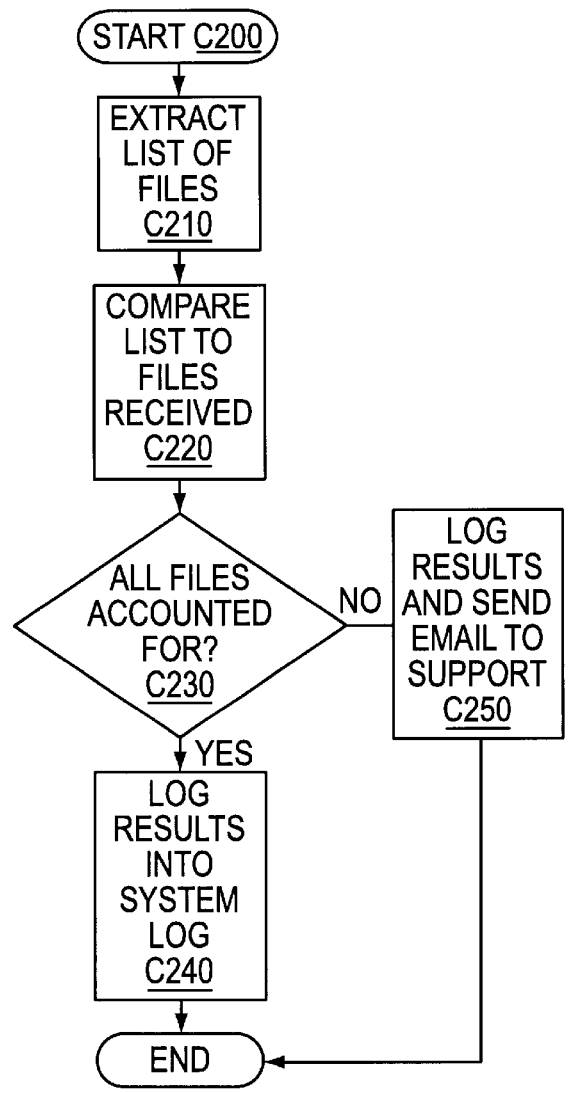
FIG. 9 is a flow chart showing further steps of the procedure of FIG. 7.

FIG. 9 illustrates the steps performed during host operations C200. In Step C210, the message extraction engine 216 extracts the list of files. In Step C220, the comparison tools 232 compare the list of received files 222 with the list of sent files. In Step C230, the comparison tools 232 determine whether all sent files have been recorded as received files. If all sent files have not been recorded as received files, the error notification tools 224 log the results and send an email message to technical support in Step C250. If the host system 200 has received all of the sent files, the results are recorded in the system log 214. It will be apparent to those skilled in the art that various modifications and variations can be made in the system and method of the present invention without departing from the spirit and scope of the invention. Thus, it is intended that the present invention cover the modifications and variations of this invention provided that they come within the scope of the appended claims and their equivalents.

What is claimed is:

1. A secure information transmission system for securely transmitting electronic files from a source system directly to a host system, the secure information transmission system comprising:
   (a) origination tools on the source system including encryption tools for encrypting a data file for attachment to an outgoing message being sent directly to the host system;
   (b) destination tools on the host system including decryption tools for decrypting the data file; and
   (c) delivery confirmation tools on both the source system and the host system, the delivery confirmation tools comprising,
      list generating tools connected with the source system for generating a list of sent data files successfully transmitted during a given time period,
      means for maintaining a list of received data files during the given period on the host system, and
      comparison means connected with the host system for comparing the list of sent data files with the list of received data files.

2. The secure information transmission system of claim 1, further comprising file generation tools for generating an index file to be paired with the data file.

3. The secure information transmission system of claim 2, further comprising examination tools for examining the index file for proper format.

4. The secure information transmission system of claim 3, further comprising failure notification tools for providing notification if the index file has an improper format.

5. The secure information transmission system of claim 1, further comprising failure notification tools for providing notification of failed encryption.

6. The secure information transmission system of claim 1, wherein the destination tools comprise an inbox for receiving an encrypted message.

7. The secure information transmission system of claim 6, wherein the destination tools comprise a message extraction engine for extracting data files from the inbox.

8. The secure information transmission system of claim 7, wherein the destination tools comprise decryption tools for decrypting extracted data files.

9. The secure information transmission system of claim 8, further comprising error notification tools for determining whether decryption has been successful.

10. The system of claim 1, wherein the delivery confirmation tools on both the source system and the host system work in conjunction to confirm delivery and receipt of messages.

11. A secure information transmission systems for securely transmitting electronic files from a source system directly to a host system, the secure information transmission system comprising:
    (a) origination tools on the source system for creating and sending files, the origination tools comprising, file generation tools for generating a data file, an encryption engine for encrypting the data file, failure indication tools for detecting rejected files from the encryption engine, attachment tools for attaching encrypted files to an email message, and emailing tools for forwarding the email message and attached file directly to the host system; and
    (b) destination tools on the host system for receiving the email message directly from the source system, the destination tools comprising, an inbox for receiving the email message, message extraction tools for extracting file attachments, decryption tools for receiving the extracted file attachments, error detection tools for detecting unsuccessful decryption attempts, and an outbox for receiving decrypted files and providing them for processing.

12. The secure information transmission system of claim 11, further comprising delivery confirmation tools on both the source system and the host system.

13. The secure information transmission system of claim 12, wherein the delivery confirmation tools comprise list generating tools connected with the source system for generating a list of sent data files during a given time period.

14. The secure information transmission system of claim 13, wherein the delivery confirmation tools further comprise means for maintaining a list of received data files during the given period on the host system.

15. The secure information transmission system of claim 14, wherein the delivery confirmation tools further comprise comparison means connected with the host system for comparing the list of sent data files with the list of received data files.

16. The secure information transmission system of claim 11, wherein the origination tools further comprise means for generating an index file to be paired with the data file.

17. The secure information transmission system of claim 16, further comprising examination tools for examining the index file for proper format.

18. A secure information transmission system for securely transmitting electronic files from a source system directly to a host system, the secure information transmission system comprising:
    (a) origination toots on the source system for creating and sending files, the origination tools comprising, file generation tools for generating a data file and an associated index file, an inbox for storing the generated data file and the index file, examination tools for examining files stored in the inbox to verify that all stored files include an index file paired with a data file, an encryption engine for encrypting the pairs of data and index files, failure indication tools for detecting rejected files from the encryption engine and the examination tools, attachment tools for attaching encrypted files to an email message, and emailing tools for forwarding the email message and attached files directly to the host system; and
    (b) destination tools on the host system for receiving the email message, the destination tools comprising, an inbox for receiving the email message, message extraction tools for extracting file attachments, decryption tools for receiving the extracted file attachments, error detection tools for detecting unsuccessful decryption attempts, and an outbox for receiving decrypted files and providing them for processing; and (c) delivery confirmation tools on both the source system and the host system, the delivery combination tools comprising, list generating tools connected with the source system for generating a list of sent files, means for maintaining a list of received files, and comparison means connected with the host system for comparing the list of sent files with the list of received files.

19. The system of claim 18 wherein the delivery confirmation tools on both the source system and the host system work in conjunction to confirm delivery and receipt of messages.

20. A method for securely transmitting electronic files from a source system directly to a host system, the method comprising:

(a) encrypting a data file for attachment to an outgoing message using encryption tools;

(b) decrypting the data file with destination tools on the host system including decryption tools for decrypting the data file; and (c) confirming delivery using confirmation tools on both the source system and the host system, wherein confirming delivery comprises, generating a list of sent data files sent during a given time period using list generating tools connected with the source system, maintaining a list of received data files during the given time period on the host system, and comparing the list of sent data files with the list of received data files using comparison means connected with the host system.

21. The method of claim 20, further comprising the step of generating an index file to be paired with the data file.

22. The method of claim 21, further comprising performing an examination routine on each index file prior to encryption.

23. The method of claim 20, further comprising the step of sending the encrypted data file to the host system.

24. The method of claim 23, further comprising the step of storing the sent message on the host system.

25. The method of claim 24, further comprising the step of extracting the stored data file.

26. The method of claim 25, further comprising the step of decrypting the extracted data file.

27. The method of claim 26, further comprising the step of moving the decrypted data file to an out box and logging results.

28. The system of claim 20, wherein confirmation tools on both the source system and the host system work in conjunction to confirm delivery and receipt of messages.

29. A method for securely transmitting electronic files from a source system directly to a host system, the method comprising:

(a) performing a remote process, the remote process comprising the steps of, generating a data file, generating an index file for pairing with the data file, sending the data file and the index file to an inbox, examining the index file in the inbox to determine if the index file is valid, encrypting at least the data file paired with a valid index file, testing for successful encryption, attaching successfully encrypted files to an email message, and sending the email message directly to the host system; and (b) performing a host procedure, the host procedure comprising the steps of, receiving and storing the message from the source system, extracting the data file and index file from the message, decrypting the data file upon successful extraction, and moving the decrypted message to an outbox for processing by another system.

30. The method of claim 29, further comprising confirming delivery using confirmation tools on both the source system and the host system.

31. The method of claim 30, wherein confirming delivery comprising generating a list of sent files sent during a give time period using list generating tools connected with the source system.

32. The method of claim 31, wherein confirming delivery further comprises maintaining a list of received files during the given period on the host system.

33. The method of claim 32, wherein confirming delivery further comprises comparing the list of sent files with the list of received files using comparison means connected with the host system.

34. A method for securely transmitting electronic files via email from a source system directly to a host system, the method comprising:

(a) performing a remote process, the remote process comprising the steps of, generating a data file, generating an index file for pairing with the data file, sending the data file and the index file to an inbox, examining the index file in the inbox to determine if the index file is valid, encrypting at least the data file paired with a valid index file, testing for successful encryption, attaching successfully encrypted files to an email message, and sending the email message directly to the host system;

(b) performing a host procedure, the host procedure comprising the steps of, receiving and storing the message from the source system, extracting the data file and index file from the message, decrypting the data file upon successful extraction, and moving the decrypted message to an outbox for processing by another system; and (c) performing a delivery verification procedure, the delivery verification procedure comprising the steps of, generating a list of successfully sent files from the source system, generating a list of received files at the host system, and comparing the list of sent files with the list of received files at the host system.

* * * * *